G. C. JENSEN.
AUTOMATICALLY OPERATED LOCKING MECHANISM FOR GEAR SHIFTING DEVICES.
APPLICATION FILED APR. 20, 1918.
1,288,906.
Patented Dec. 24, 1918.
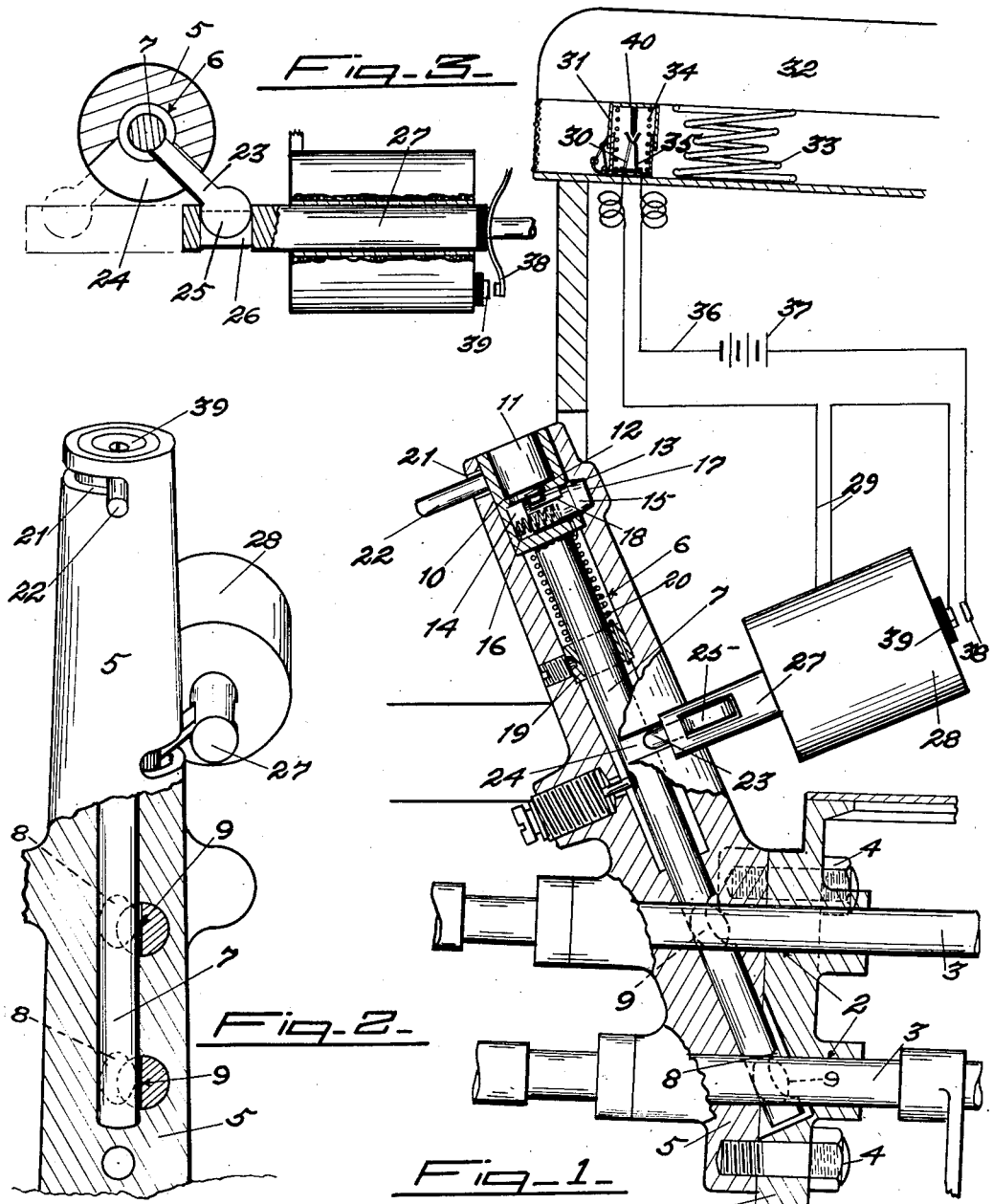
WITNESS:
INVENTOR.
George C. Jensen
BY
ATTORNEYS.

UNITED STATES PATENT OFFICE.

GEORGE C. JENSEN, OF OAKLAND, CALIFORNIA.

AUTOMATICALLY-OPERATED LOCKING MECHANISM FOR GEAR-SHIFTING DEVICES.

1,288,906.  Specification of Letters Patent.  Patented Dec. 24, 1918.

Application filed April 20, 1918. Serial No. 229,766.

*To all whom it may concern:*

Be it known that I, GEORGE C. JENSEN, a citizen of the United States, residing at Oakland, in the county of Alameda and State of California, have invented certain new and useful Improvements in Automatically - Operated Locking Mechanism for Gear-Shifting Devices, of which the following is a specification.

The locking mechanism for gear shifting devices as at present constructed are of such a type as to require the operator to positively operate the locking member in order to lock the gear shifting devices from movement.

The present invention relates to a construction whereby the gear shifting device or devices are capable of being automatically locked from operative movement, at such time as the vehicle operator leaves or is about to leave the vehicle, when the shifting devices are in neutral position and the motor is at a point of rest.

The invention consists broadly in a device associated with a locking bolt and which is capable of operation to throw the locking bolt to locking position, due to the operation of certain other devices at a point distant from the locking bolt and which are operated by the vehicle operator after bringing the car to a point of rest and prior to leaving same.

The principal object of the present invention is to provide a means whereby the locking of the vehicle from operative movement by unauthorized persons is precluded, during such times as the vehicle motor is at a point of rest and the vehicle is unoccupied.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference should be had to the accompanying sheets of drawings, wherein—

Figure 1 is a vertical sectional view of one of the embodiments of the present invention, illustrating one form of operating device therefor.

Fig. 2 is a broken sectional view taken at right angles to the section illustrated in Fig. 1 of the drawings.

Fig. 3 is a transverse sectional view taken through the locking bolt and illustrating the solenoid and armature.

Referring more particularly to the several views of the drawings, wherein like characters of reference designate corresponding parts,—1 indicates a suitable gear casing provided with guide openings 2 for receiving the movable shifter devices 3, of any suitable form, which are adapted for operation in any suitable manner, as by a lever of any well known type, not illustrated. Secured to the casing 1, preferably by the bolts 4, is a member 5 preferably in the form of a casting, said member provided with openings for alining with the openings 2 and for receiving the ends of the shifter devices projecting beyond the casing 1. The member 5 extends upwardly from the casing 1 and is provided with a longitudinal bore 6 which intersects the bores in which the shifting devices 3 are slidably mounted.

Axially rotatable within said bore 6 is a locking bolt 7 preferably of the type having semi-circular depressions 8 for receiving the peripheral surface of the shifting devices 3 to permit longitudinal movement thereof, and said bolt is disposed, when rotated to position the peripheral surface thereof, into suitable semi-circular depressions 9 in the surface of the shifting devices 3, to prevent or lock the shifting devices from operative movement.

The upper end of said bolt 7 is formed with a cupped member 10 within which is mounted a key controlled lock casing 11, of any well known type, the rotatable barrel 12 of which is provided with an eccentrically disposed extension 13 extending into a transverse bore 14 in the member 10. In the bore 14 is slidably mounted a locking plunger 15 outwardly pressed by a spring 16 for reception at its outer end in a depression 17 in the member 5 at one side of the opening 6. The member 15 is formed with an elongated recess in which the portion 13 extends, whereby rotation of the barrel 12 will cause a withdrawal of the bolt 15 from the depression 17, and a further rotation of the barrel will remove the portion 13 from contact with the sides of the depression 18 to permit the spring to force the same outwardly on an alining of the end thereof with the opening 17.

Coiled about the upper end of the bolt 7 and secured at one end to the cupped member 10 and at its opposite end to a collar 19 secured within the bore 6 and within which the bolt 7 rotates, is a coiled spring 20 for rotating the bolt 7 to unlocked or inoperative position on the release of the bolt 15 from the depression 17. Extending laterally from the cupped member 10, through a slot 21 in the upper end of the member 5, is an operating handle 22 adapted for engagement when it is desired to manually throw the bolt 17 from inoperative to locked position against the tension of the spring 20.

To automatically throw the bolt 7 from inoperative to locked position, it is preferable to employ an arm 23 extending laterally from the bolt and through a guide slot 24 in the member 5, the outer end of said arm being rounded, as at 25, and received within an opening 26 in the end of an armature 27 within a solenoid 28.

Leads 29 connect with the solenoid 28, and one of said leads connects with a spring finger 30 within a suitable telescopic shell 31 preferably positioned beneath the seat 32 of the vehicle, and which is the seat occupied by the vehicle operator.

A spring 33 normally maintains the seat raised during such time as it is unoccupied, and the coiled spring 34 within the telescopic shell 31 also assists said spring 33. A spring finger 35 is positioned within said member 31 adjacent the finger 30 and from the same extends a lead 36 having therein a source of electric current 37, preferably a battery, and said lead connects with a spring terminal 38 adapted for contacting with the terminal 39 secured to one of the wires 29, said spring terminal adapted to be disconnected from the terminal 39 during such time as the bolt 7 is in locked position, thereby breaking the battery circuit to the solenoid should the seat 32 be unoccupied and the spring fingers 30 and 35 contacting.

The movable portion of the telescopic member 31 carries a spreader pin 40 of insulating material, and which is adapted to pass between the fingers 30 and 35 and separate the same when the seat is occupied.

The operation of the device is as follows: During such time as the shifting devices 3 are capable of operative movement, the locking bolt 7, due to the retracting of the bolt 15, has been rotated by the spring 20 to cause the recesses 8 therein to register with the recesses 9 in the shifting devices 3, and such movement causes a longitudinal movement of the armature 27 within the solenoid 28, as in dotted line position, Fig. 3. This movement permits the making of a circuit between 38 and 39, and the seat 32 having been previously occupied by the vehicle operator, the fingers 30 and 35 are separated. During this time the shifting of the gears of the vehicle is capable of being readily accomplished by any suitable mechanism. However, should it be desired that the operator shift the gears to neutral position, thus stopping the vehicle and absent himself therefrom, immediately upon his leaving the seat, the spreader pin 40 will be withdrawn from between the fingers 30 and 35, permitting the same to contact, at which time the solenoid will be energized to rotate the bolt 17 against the action of the spring 20 and position the peripheral surface thereof in the recesses 9 and at the same time permitting the plunger 15 to seat in the recess 17. The shifting devices are thus automatically locked and the vehicle is precluded from being operated under its own power.

Having thus described my invention what I claim is:

1. In combination with a shifting mechanism for variable speed power transmitting mechanism, of means for locking the same from operative movement, devices operated from a distant point for throwing said locking means to operative position to lock said shifting mechanism from movement, and a manually releasable lock for retaining said locking means in its operative position.

2. In combination with a shifting mechanism for variable speed power transmitting mechanism, of means for locking the same from operative movement, means for automatically throwing said locking means to operative position to lock said shifting mechanism from movement, and a manually releasable lock for retaining said locking means in its operative position.

3. In combination with a shifting mechanism for variable speed power transmitting mechanism, manually releasable lock controlled means for locking the same from operative movement, and means for automatically throwing said locking means to operative position to lock said shifting mechanism from movement.

4. In combination with shifting mechanism for variable speed power transmitting mechanism, of manually releasable lock controlled means for locking the same from operative movement, and electrically controlled means operated from a distant point for automatically operating said locking means to lock said shifting mechanism from movement.

5. In combination with shifting mechanism for variable speed power transmitting mechanism, of a movable locking device coöperating therewith and capable of movement to operative position to lock said mechanism from movement, electrically operated means for moving said locking device to operative position and releasable lock controlled means for retaining said locking device in operative position.

6. In combination with shifting mechanism for variable speed power transmitting mechanism, of a movable locking device coöperating therewith and capable of movement to operative position to lock said mechanism from movement, electrically operated means for moving said locking device to operative position, releasable lock controlled means for retaining said locking device in operative position, and means for restoring said locking device to inoperative position on the release of said lock controlled means.

7. In combination with a shifting mechanism for variable speed power transmitting mechanism, of a movable locking device coöperating therewith and capable of movement to operative position to lock said mechanism from movement, a solenoid, an electric circuit connected therewith and including a switch, an armature associated with said locking device and solenoid and capable of movement on the energizing of said solenoid for moving said locking device to operative position, and releasable lock controlled means for locking said locking device in its operative position.

8. In combination with a longitudinally movable shifter device with a recess in its surface, an axially rotatable locking bolt arranged at an angle to said shifter device and intersecting the path of movement thereof, said bolt at its point of intersection with said shifter device having a recess providing a reduced cross-sectional area for said bolt at said point, a member within which said bolt rotates, said bolt adapted on rotation to position the reduced area of its surface in full register with said recess to admit of longitudinal movement of said shifter device and on rotation to move said point of reduced area from full register with said shifter device recess to cause said shifter device to be locked from movement, means whereby said bolt is capable of rotation, and means for locking said bolt when rotated to its latter position.

9. In combination with a longitudinally movable shifter device provided with a recess in its surface, an axially rotatable locking bolt arranged at an angle to said shifter device and intersecting the path of movement thereof, said bolt at its point of intersection with said shifter device having a recess providing a reduced cross-sectional area for said bolt at said point, a member within which said bolt rotates, said bolt adapted on rotation to position the reduced area of its surface in full register with said recess to admit of longitudinal movement of said shifter device and on rotation to move said point of reduced area from full register with said shifter device recess to cause said shifter device to be locked from movement, electrically operated means for rotating said bolt and means for locking said bolt when rotated to its latter position.

10. In combination with a longitudinally movable shifter device provided with a recess in its surface, an axially rotatable locking bolt arranged at an angle to said shifter device and intersecting the path of movement thereof, said bolt at its point of intersection with said shifter device having a recess providing a reduced cross-sectional area for said bolt at said point, a member within which said bolt rotates, said bolt adapted on rotation to position the reduced area of its surface in full register with said recess to admit of longitudinal movement of said shifter device and on rotation to move said point of reduced area from full register with said shifter device recess to cause said shifter device to be locked from movement, means whereby said bolt is capable of rotation, a spring-pressed latch carried by and extending laterally from the bolt, a lock mechanism carried by the bolt and adapted for operation to retract said latch, and a recess within said bolt receiving member for receiving said latch on the rotation of the bolt to said latter position to lock said bolt from rotation.

11. In combination with a longitudinally movable shifter device provided with a recess in its surface, an axially rotatable locking bolt arranged at an angle to said shifter device and intersecting the path of movement thereof, said bolt at its point of intersection with said shifter device having a recess providing a reduced cross-sectional area for said bolt at said point, a member within which said bolt rotates; said bolt adapted on rotation to position the reduced area of its surface in full register with said recess to admit of longitudinal movement of said shifter device and on rotation to move said point of reduced area from full register with said shifter device recess to cause said shifter device to be locked from movement, means whereby said bolt is capable of rotation, a spring-pressed latch carried by and capable of projecting laterally from said bolt, said latch provided with an elongated depression, a lock casing within a recess in said bolt, a key actuated locking barrel rotatable within said casing and provided with an eccentrically disposed tongue extending into said latch depression, said bolt receiving member provided with a recess for receiving the outer end of said latch when said bolt is rotated to its latter position.

12. In combination with a longitudinally movable shifter device provided with a recess in its surface, an axially rotatable locking bolt therefor and having in the region of said shifter device a cross-sectional area greater in one direction than in another, said bolt adapted for axial rotation to position its area of greatest cross-section parallel with said shifter device permitting operative movement of said device and of axial rotation to position said area of greatest cross-section at an angle to said recess whereby said shifter device is locked from movement, means for axially rotating said bolt, and a self-contained lock carried within the bolt for locking the same in said latter position.

13. In combination with a longitudinally movable shifter device provided with a recess in its surface, an axially rotatable locking bolt therefor, and having in the region of said shifter device a cross-sectional area greater in one direction than in another, said bolt adapted for axial rotation to position its area of greatest cross-section parallel with said shifter device permitting operative movement of said device and of axial rotation to position said area of greatest cross-section at an angle to said recess whereby said shifter device is locked from movement, means for axially rotating said bolt, a spring-pressed locking latch adapted for projecting laterally from said bolt, a key-controlled locking barrel within said bolt and coöperating with said latch and adapted for operation to retract said latch to permit the rotation of the bolt to locked position, said latch adapted on the rotation of the bolt to locked position to project into a recess and prevent movement of said bolt to unlocked position until such time as said barrel is operated.

In testimony whereof I have signed my name to this specification in the presence of two subscribing witnesses.

GEORGE C. JENSEN.

Witnesses:
 EARL G. SMITH,
 JOHN R. TODD.